United States Patent
Wang et al.

(10) Patent No.: US 11,206,702 B2
(45) Date of Patent: Dec. 21, 2021

(54) METHOD FOR ACCESSING NETWORK BY USER EQUIPMENT UE, NETWORK DEVICE, AND FIRST UE

(71) Applicant: HUAWEI TECHNOLOGIES CO., LTD., Shenzhen (CN)

(72) Inventors: Da Wang, Shenzhen (CN); Nathan Edward Tenny, San Diego, CA (US); Hui Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 276 days.

(21) Appl. No.: 16/090,245

(22) PCT Filed: Mar. 31, 2016

(86) PCT No.: PCT/CN2016/078112
§ 371 (c)(1),
(2) Date: Sep. 29, 2018

(87) PCT Pub. No.: WO2017/166203
PCT Pub. Date: Oct. 5, 2017

(65) Prior Publication Data
US 2019/0124707 A1 Apr. 25, 2019

(51) Int. Cl.
*H04W 76/14* (2018.01)
*H04W 88/04* (2009.01)
(Continued)

(52) U.S. Cl.
CPC ............ *H04W 76/14* (2018.02); *H04W 8/08* (2013.01); *H04W 40/22* (2013.01); *H04W 48/14* (2013.01);
(Continued)

(58) Field of Classification Search
CPC ..... H04W 76/14; H04W 88/04; H04W 76/27; H04W 80/08; H04W 8/08; H04W 48/14; H04W 76/11
See application file for complete search history.

(56) References Cited

U.S. PATENT DOCUMENTS

2012/0039240 A1* 2/2012 Han ...................... H04B 7/2606
370/315
2013/0064116 A1* 3/2013 Speight .............. H04B 7/15528
370/252
(Continued)

FOREIGN PATENT DOCUMENTS

CN 102811497 A 12/2012
CN 103987042 A 8/2014
(Continued)

OTHER PUBLICATIONS

3GPP TS 36.331 V13.0.0 (Dec. 2015), 3rd Generation Partnership Project; Technical Specification Group Radio Access Network;Evolved Universal Terrestrial Radio Access (E-UTRA);Radio Resource Control (RRC);Protocol specification (Release 13), Dec. 2015. total 507 pages.
(Continued)

*Primary Examiner* — Walli Z Butt
*Assistant Examiner* — Thad N Defauw
(74) *Attorney, Agent, or Firm* — Maier & Maier, PLLC

(57) ABSTRACT

A method for accessing a network by UE, a network device, and first UE are disclosed. The first UE sends a first message, where the first message includes a message that second UE accesses a network by being associated with the first UE; and after an access response sent by the network device is received, the first UE and the second UE associated with the first UE access the network. After receiving the first message, the network device sends an access response to the first
(Continued)

UE, to specifically allocate a transmission resource to a wearable device that needs to transmit data, so as to save network resources.

17 Claims, 7 Drawing Sheets

(51) Int. Cl.

| | | |
|---|---|---|
| H04W 76/27 | (2018.01) | |
| H04W 76/11 | (2018.01) | |
| H04W 8/08 | (2009.01) | |
| H04W 48/14 | (2009.01) | |
| H04W 40/22 | (2009.01) | |
| H04W 76/12 | (2018.01) | |
| H04W 74/08 | (2009.01) | |
| H04W 80/02 | (2009.01) | |
| H04W 80/08 | (2009.01) | |

(52) U.S. Cl.
CPC ............ *H04W 76/11* (2018.02); *H04W 76/12* (2018.02); *H04W 76/27* (2018.02); *H04W 88/04* (2013.01); *H04W 74/0833* (2013.01); *H04W 80/02* (2013.01); *H04W 80/08* (2013.01)

(56) References Cited

U.S. PATENT DOCUMENTS

| | | |
|---|---|---|
| 2015/0072653 A1 | 3/2015 | Fan et al. |
| 2015/0312909 A1 | 10/2015 | Ohta et al. |
| 2016/0316494 A1* | 10/2016 | Quan ...................... H04L 29/06 |
| 2017/0055149 A1* | 2/2017 | Lehtovirta ............ H04W 76/14 |
| 2018/0227970 A1 | 8/2018 | Jin et al. |
| 2020/0288535 A1* | 9/2020 | Sharma ............. H04W 36/0033 |

FOREIGN PATENT DOCUMENTS

| | | |
|---|---|---|
| CN | 104581902 A | 4/2015 |
| CN | 105071824 A | 11/2015 |
| CN | 105450546 A | 3/2016 |
| EP | 2770792 A1 | 8/2014 |
| EP | 3376788 A1 | 9/2018 |

OTHER PUBLICATIONS

3GPP TS 36.300 V13.2.0 (Dec. 2015),3rd Generation Partnership Project;Technical Specification Group Radio Access Network;Evolved Universal Terrestrial Radio Access (E-UTRA)and Evolved Universal Terrestrial Radio Access Network(E-UTRAN);Overall description;Stage 2(Release 13), Dec. 2015. total 290 pages.
3GPP TS 36.321 V13.0.0 (Dec. 2015),3rd Generation Partnership Project; Technical Specification Group Radio Access Network;Evolved Universal Terrestrial Radio Access (E-UTRA);Medium Access Control (MAC) protocol specification (Release 13), Dec. 2015. total 82 pages.

* cited by examiner

METHOD FOR ACCESSING NETWORK BY USER EQUIPMENT UE, NETWORK DEVICE, AND FIRST UE

CROSS-REFERENCE TO RELATED APPLICATIONS

This application is a national stage of International Application No. PCT/CN2016/078112, filed on Mar. 31, 2016, which is hereby incorporated by reference in its entirety.

TECHNICAL FIELD

The present invention relates to the field of communications technologies, and in particular, to a method for accessing a network by user equipment (user equipment, UE), a network device, and first UE.

BACKGROUND

With continuous development of communications technologies, intelligent user equipment, such as a wearable device, is one of directions for future development of the consumer electronics market.

A wearable device is portable user equipment that is directly worn on a body or integrated into clothing or an accessory of a user. The wearable device is not merely a hardware device, and further implements a powerful function through software support, data exchange, or cloud interaction. For example, a watch on which a subscriber identity module (Subscriber Identity Module, SIM) can be installed has been launched in the industry, so that the watch can be directly connected to a network. It is a future development trend that a wearable device is directly connected to a network.

Because of a limited size of the wearable device, a battery and an antenna of the wearable device are main problems affecting the wearable device. Because of a small battery capacity, when directly communicating with a base station, the wearable device quickly runs out of battery, and a standby time is short. Because wearable devices generally have special shapes, it is difficult to design an antenna. Currently, only a single antenna can be implemented, and therefore the wearable device needs to consume more time and more network resources to send a same data volume than a multi-antenna device.

Currently, if a wearable device needs to access a network, the wearable device may access the network by using an intelligent terminal such as a smartphone, so that battery power of the wearable device can be reduced. As shown in FIG. 1, each intelligent terminal may be connected to a plurality of wearable devices, and act as a relay to enable the connected wearable devices to access a network. After the wearable device accesses the network by using the intelligent terminal, if neither the wearable device nor the intelligent terminal both needs to transmit a service, both the wearable device and the intelligent terminal enter an idle (idle) mode. If the wearable device needs to transmit a service later, the wearable device accesses the intelligent terminal, and transmits the service to the network by using the intelligent terminal. In this case, after receiving a network access request from the wearable device, the intelligent terminal needs to first access a network randomly, and a network side needs to set up contexts for the intelligent terminal and the wearable device, for example, a data radio bearer (data radio bearer, DRB). The DRB may be used to carry data of the wearable device. However, if the intelligent terminal is matched with a plurality of wearable devices, the network side sets up contexts for all the matched wearable devices because the network side does not know which wearable device needs to access the network. In this case, if only one of the wearable devices needs to access the network to transmit data, the network side needs to set up contexts for all the wearable devices and the intelligent terminal, and this wastes network resources.

SUMMARY

The present invention provides a method for accessing a network by user equipment, a base station, and first user equipment, to specifically allocate a transmission resource to a wearable device that needs to transmit data, so as to save network resources.

According to a first aspect, a method for accessing a network by user equipment UE is provided, including: sending, by first UE, a first message, where the first message includes a message that second UE accesses a network by being associated with the first UE; and after an access response sent by a network device is received, assessing, by the first UE and the second UE associated with the first UE, the network, where after receiving the first message, the network device sends the access response to the first UE.

With reference to the first aspect, in a first possible implementation of the first aspect, the method further includes: sending, by the first UE, a second message, so that the network device allocates a network resource to the first UE based on the first message and the second message, or the network device allocates a network resource to the first UE and the second UE based on the first message and the second message, where the second message includes an identifier of the second UE that accesses the network by being associated with the first UE, and/or a quantity of second UEs that access the network by being associated with the first UE.

With reference to the first aspect or the first possible implementation of the first aspect, in a second possible implementation of the first aspect, the sending, by first UE, a first message includes: sending, by the first UE, the first message by using a network access preamble preamble sequence; or sending, by the first UE, the first message by using a preset bit of a Media Access Control MAC layer and/or a preset bit of a Packet Data Convergence Protocol PDCP layer.

With reference to the second possible implementation of the first aspect, in a third possible implementation of the first aspect, the sending, by the first UE, the first message by using a network access preamble preamble sequence includes: sending, by the first UE, the first message by using some preamble sequences used to access the network; or sending, by the first UE, the first message by using another preamble sequence other than the preamble sequence that is used to access the network.

With reference to any one of the first aspect to the third possible implementation of the first aspect, in a fourth possible implementation of the first aspect, the first message further includes a message that the first UE accesses the network.

With reference to any one of the second possible implementation of the first aspect to the fourth possible implementation of the first aspect, in a fifth possible implementation of the first aspect, the sending, by the first UE, a second message includes: sending, by the first UE, the second message by using a preset uplink common control channel CCCH message message; or sending, by the first UE, the second message by using the preset bit of the MAC layer and/or the preset bit of the PDCP layer.

With reference to the fifth possible implementation of the first aspect, in a sixth possible implementation of the first aspect, the sending, by the first UE, the second message by using a preset uplink CCCH message includes: sending, by the first UE, the second message by using a radio control connection request RRC connection request, where an RRC message in the RRC connection request includes the identifier of the second UE that accesses the network by being associated with the first UE, and/or the quantity of second UEs that access the network by being associated with the first UE.

With reference to the fifth possible implementation of the first aspect, in a seventh possible implementation of the first aspect, the identifier of the second UE includes at least one of the following identifiers: a cell radio network temporary identifier C-RNTI; a short format temporary mobile subscriber identity S-TMSI; and an identifier corresponding to an identifier of the first UE.

According to a second aspect, a method for accessing a network by user equipment UE is provided, including: receiving, by a network device, a first message sent by first UE, where the first message includes a message that second UE accesses a network by being associated with the first UE; and after receiving the first message, sending, by the network device, an access response to the first UE, so that the first UE and the second UE access the network.

With reference to the second aspect, in a first possible implementation of the second aspect, the method further includes: allocating, by the network device, a network resource to the first UE and the second UE based on the first message, or allocating a network resource to the first UE, so that after the first UE receives the network resource allocated by the network device, the first UE and the second UE associated with the first UE send data by using the network resource.

With reference to the first possible implementation of the second aspect, in a second possible implementation of the second aspect, the method further includes: obtaining, by the network device, a second message sent by the first UE, where the second message includes an identifier of the second UE that accesses the network by being associated with the first UE, and/or a quantity of second UEs that access the network by being associated with the first UE, and the allocating, by the network device, a network resource to the first UE and the second UE based on the first message includes: allocating, by the network device, the network resource to the first UE and the second UE based on the first message and the second message.

With reference to any one of the second aspect to the second possible implementation of the second aspect, in a third possible implementation of the second aspect, the obtaining, by a network device, a first message sent by first UE includes: obtaining, by the network device from a network access preamble preamble sequence sent by the first UE, the first message sent by the first UE; or obtaining, by the network device from a preset bit of a Media Access Control address MAC layer and/or a preset bit of a Packet Data Convergence Protocol PDCP layer, the first message sent by the first UE.

With reference to any one of the second aspect to the third possible implementation of the second aspect, in a fourth possible implementation of the second aspect, the first message further includes a message that the first UE accesses the network.

With reference to the second aspect, in a fifth possible implementation of the second aspect, the obtaining, by the network device, a second message sent by the first UE includes: obtaining, by the network device, the second message from a preset uplink common control channel CCCH message message sent by the first UE; or obtaining, by the network device, the second message from a specified bit of a MAC layer and/or a specified bit of a PDCP layer of the first UE.

With reference to the fifth possible implementation of the second aspect, in a sixth possible implementation of the second aspect, the obtaining, by the network device, the second message from a preset uplink CCCH message sent by the first user equipment includes: receiving, by the network device, a radio control connection request RRC connection request sent by the first UE; and obtaining, by the network device, the second message from the RRC connection request, where an RRC message in the RRC connection request includes an identifier of the second UE that accesses the network by being associated with the first UE, and/or a quantity of second UEs that access the network by being associated with the first UE.

With reference to the sixth possible implementation of the second aspect, in a seventh possible implementation of the second aspect, the identifier of the second UE includes one of the following identifiers: a cell radio network temporary identifier C-RNTI; a short format temporary mobile subscriber identity S-TMSI; and an identifier corresponding to an identifier of the first UE.

With reference to any one of the fifth to the seventh possible implementations of the second aspect, in an eighth possible implementation of the second aspect, after the obtaining, by the network device, the second message from the RRC connection request, the method further includes: obtaining, by the network device, the identifier of the second UE from the second message; determining, based on a stored correspondence between an identifier of the second UE and an identifier of the first UE, the identifier of the first UE corresponding to the obtained identifier of the second UE; and determining, based on the identifier of the first UE corresponding to the obtained identifier of the second UE, the first UE associated with the second user equipment.

With reference to any one of the fifth to the seventh possible implementations of the second aspect, in a ninth possible implementation of the second aspect, after the obtaining, by the network device, the second message from the RRC connection request, the method further includes: obtaining, by the network device, the identifier of the first UE and the identifier of the second UE from the second message; and determining, based on the obtained identifier of the first UE, the obtained identifier of the second UE, and a stored correspondence between an identifier of the second UE and an identifier of the first UE, the first UE associated with the second UE.

With reference to the second possible implementation of the second aspect, in a tenth possible implementation of the second aspect, the allocating, by the network device, the network resource to the first UE and the second UE based on the first message and the second message includes: after receiving a network access message that is sent by at least one second UE by using the associated first UE, generating, by the network device, a corresponding S1AP identifier for the second UE; and sending, by the network device, the S1AP identifier.

According to a third aspect, a method for accessing a network by user equipment UE is provided, including: sending, by first UE, a second message, where the second message includes an identifier of second UE that accesses a network by being associated with the first UE, and/or a quantity of second UEs that access the network by being associated with the first UE; and after an access response sent by a network device is received, accessing, by the first UE and the second UE associated with the first UE, the network.

With reference to the third aspect, in a first possible implementation of the third aspect, the sending, by first UE, a second message includes: sending, by the first UE, the second message by using a preset uplink common control channel CCCH message message; or sending, by the first UE, the second message by using a preset bit of a MAC layer and/or a preset bit of a PDCP layer.

With reference to the first possible implementation of the third aspect, in a second possible implementation of the third aspect, the sending, by the first UE, the second message by using a preset uplink CCCH message includes: sending, by the first UE, the second message by using a radio control connection request RRC connection request, where an RRC message in the RRC connection request includes the identifier of the second UE that accesses the network by being associated with the first UE, and/or the quantity of second UEs that access the network by being associated with the first UE.

With reference to the first possible implementation of the third aspect, in a third possible implementation of the third aspect, the identifier of the second UE includes at least one of the following identifiers: a cell radio network temporary identifier C-RNTI; a short format temporary mobile subscriber identity S-TMSI; and an identifier corresponding to an identifier of the first UE.

According to a fourth aspect, a method for accessing a network by user equipment UE is provided, including: receiving, by a network device, a second message sent by first UE, where the second message includes an identifier of second UE that accesses a network by being associated with the first UE, and/or a quantity of second UEs that access the network by being associated with the first UE; and after receiving the second message, sending, by the network device, an access response to the first UE, so that the first UE and the second UE access the network.

With reference to the fourth aspect, in a first possible implementation of the fourth aspect, the method further includes: allocating, by the network device, a network resource to the first UE and the second UE based on the second message, or allocating a network resource to the first UE, so that after the first UE receives the network resource allocated by the network device, the first UE and the second UE associated with the first UE send data by using the network resource.

With reference to the first possible implementation of the fourth aspect, in a second possible implementation of the fourth aspect, the receiving, by a network device, a second message sent by first UE includes: obtaining, by the network device, the second message from a preset uplink common control channel CCCH message message sent by the first UE; or obtaining, by the network device, the second message from a specified bit of a MAC layer and/or a specified bit of a PDCP layer of the first UE.

With reference to the second possible implementation of the fourth aspect, in a third possible implementation of the fourth aspect, the obtaining, by the network device, the second message from a preset uplink CCCH message sent by the first user equipment includes: receiving, by the network device, a radio control connection request RRC connection request sent by the first UE; and obtaining, by the network device, the second message from the RRC connection request, where an RRC message in the RRC connection request includes the identifier of the second UE that accesses the network by being associated with the first UE, and/or the quantity of second UEs that access the network by being associated with the first UE.

With reference to the third possible implementation of the fourth aspect, in a fourth possible implementation of the fourth aspect, the identifier of the second UE includes one of the following identifiers: a cell radio network temporary identifier C-RNTI; a short format temporary mobile subscriber identity S-TMSI; and an identifier corresponding to an identifier of the first UE.

According to a fifth aspect, first UE is provided. The first UE has a function of implementing an action of a terminal in any method design of the first aspect or the first to the seventh possible implementations of the first aspect. The function may be implemented by using hardware, or may be implemented by executing corresponding software by hardware. The hardware or the software includes one or more modules corresponding to the function.

According to a sixth aspect, a network device is provided. The network device has a function of implementing an action of a network device in any method design of the second aspect or the first to the tenth possible implementations of the second aspect. The function may be implemented by using hardware, or may be implemented by executing corresponding software by hardware. The hardware or the software includes one or more modules corresponding to the function.

According to a seventh aspect, first UE is provided. The first UE has a function of implementing an action of a terminal in any method design of the third aspect or the first to the third possible implementations of the third aspect. The function may be implemented by using hardware, or may be implemented by executing corresponding software by hardware. The hardware or the software includes one or more modules corresponding to the function.

According to an eighth aspect, a network device is provided. The network device has a function of implementing an action of a network device in any method design of the fourth aspect or the first to the third possible implementations of the fourth aspect. The function may be implemented by using hardware, or may be implemented by executing corresponding software by hardware. The hardware or the software includes one or more modules corresponding to the function.

According to a ninth aspect, first UE is provided. The first UE has a function of implementing an action of a terminal in any method design of the first aspect or the first to the seventh possible implementations of the first aspect. The function may be implemented by using hardware, or may be implemented by executing corresponding software by hardware. The hardware or the software includes one or more modules corresponding to the function.

With reference to the ninth aspect, in a first possible implementation of the ninth aspect, a structure of the first UE includes a memory and a processor. The memory is configured to store a set of programs, and the processor is configured to invoke the programs stored in the memory, to perform the method in any one of the first aspect, or the first to the seventh possible implementations of the first aspect.

According to a tenth aspect, a network device is provided. The network device has a function of implementing an action of a network device in any method design of the second aspect or the first to the tenth possible implementations of the second aspect. The function may be implemented by using hardware, or may be implemented by executing corresponding software by hardware. The hardware or the software includes one or more modules corresponding to the function.

With reference to the tenth aspect, in a first possible implementation of the tenth aspect, a structure of the network device includes a memory and a processor. The memory is configured to store a set of programs, and the processor is configured to invoke the programs stored in the memory, to perform the method in any one of the second aspect, or the first to the tenth possible implementations of the first aspect.

According to an eleventh aspect, first UE is provided. The first UE has a function of implementing an action of a terminal in any method design of the third aspect or the first to the third possible implementations of the third aspect. The function may be implemented by using hardware, or may be implemented by executing corresponding software by hardware. The hardware or the software includes one or more modules corresponding to the function.

With reference to the eleventh aspect, in a first possible implementation of the eleventh aspect, a structure of the first UE includes a memory and a processor. The memory is configured to store a set of programs, and the processor is configured to invoke the programs stored in the memory, to perform the method in any one of the second aspect, or the first to the third possible implementations of the first aspect.

According to a twelfth aspect, a network device is provided. The network device has a function of implementing an action of a network device in any method design of the twelfth aspect or the first to the third possible implementations of the twelfth aspect. The function may be implemented by using hardware, or may be implemented by executing corresponding software by hardware. The hardware or the software includes one or more modules corresponding to the function.

With reference to the twelfth aspect, in a first possible implementation of the twelfth aspect, a structure of the network device includes a memory and a processor. The memory is configured to store a set of programs, and the processor is configured to invoke the programs stored in the memory, to perform the method in any one of the second aspect, or the first to the third possible implementations of the first aspect.

By using the foregoing technical solutions, first UE sends a first message, and after receiving the first message, a network device sends an access response to the first UE. After the first UE receives the access response sent by the network device, the first UE and the second UE associated with the first UE access a network, so that a transmission resource can be specifically allocated to the second UE that needs to transmit data, and network resources are reduced.

DESCRIPTION OF EMBODIMENTS

Main implementation principles and specific implementations of technical solutions in embodiments of the present invention, and corresponding beneficial effects that can be achieved thereby are described below in detail with reference to the accompanying drawings.

For ease of description, in the technical solutions provided in the embodiments of the present invention, an example in which first UE and second UE are included, and network devices are a base station and a mobility management entity (Mobility Management Entity, MME) is used for detailed description. The second UE may be a device such as a wearable device or a sensor, or may be a chip or module that can be worn or has a sensing function. The first UE may be a device such as a smartphone or an iPad, or may be a chip or module that has a mobile communications function.

Further, in the technical solutions provided in the embodiments of the present invention, when allocating a network resource based on a received first message and/or second message sent by the first UE, the network device may allocate the network resource to the first UE. Alternatively, the network device may allocate the network resource to the first UE and the second UE based on a received first message and/or second message sent by the first UE. In the technical solutions provided in the embodiments of the present invention, detailed description is provided based on an example in which the network device allocates the network resource to the first UE and the second UE based on the received first message and/or second message sent by the first UE.

Embodiment 1

Figure 1:
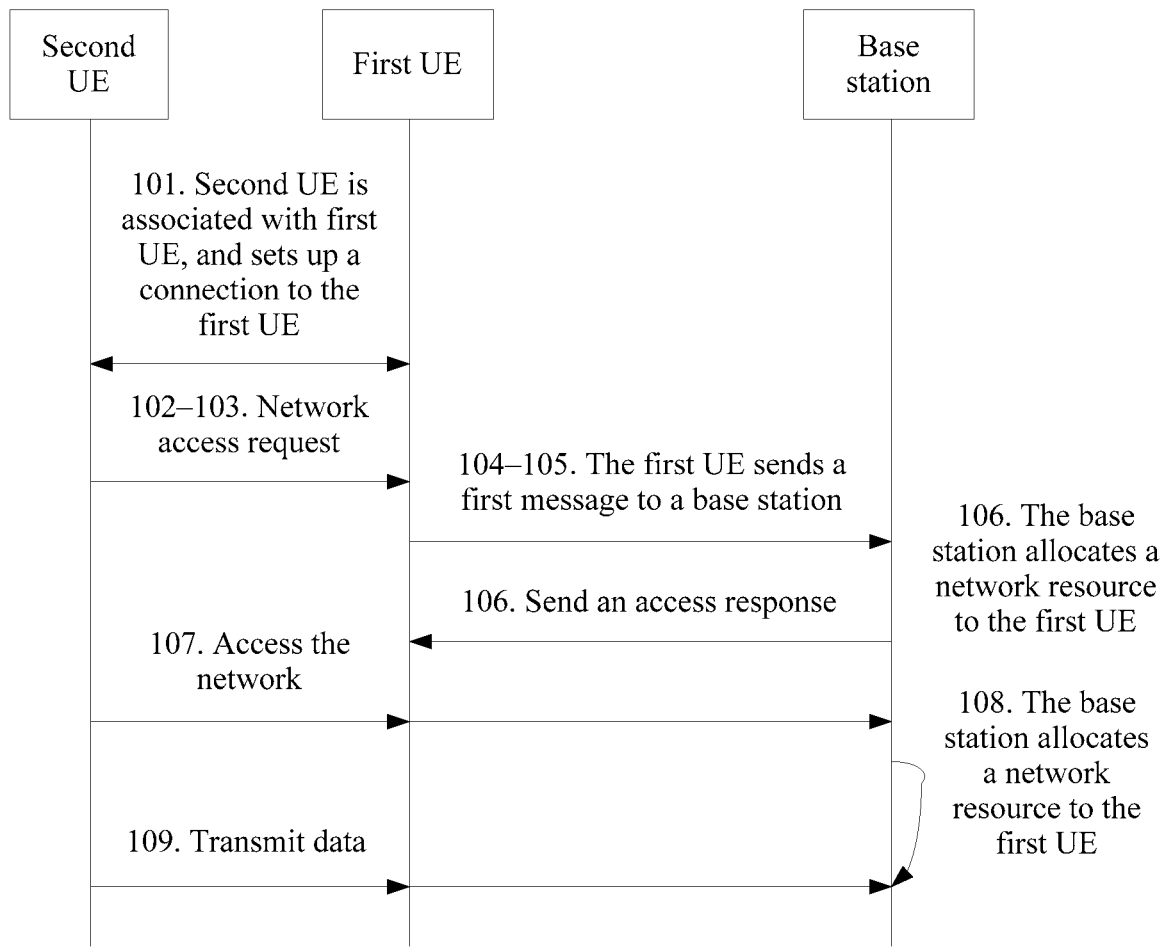
FIG. 1 is a flowchart of a method for accessing a network by UE according to Embodiment 1 of the present invention.

Embodiment 1 of the present invention provides a method for accessing a network by UE. As shown in FIG. 1, a specific processing procedure of the method is as follows.

101. Second UE is associated with first UE, and sets up a connection to the first UE.

In a technical solution provided in Embodiment 1 of the present invention, the first UE may be associated with a plurality of second UEs. That second UE is associated with first UE specifically means that a relationship is set up between the first UE and the second UE, for example, an association relationship, or a matching relationship, or a trusted relationship is set up. Therefore, the second UE can access a network by using the first UE, or send data to a network by using the first UE.

The second UE is associated with the first UE by using an interface between the second UE and the first UE, so that the second UE accesses the network by using the first UE. The second UE may be associated with the first UE in a device-to-device (Device to Device, D2D) manner in an LTE communications system, or in a Bluetooth, Wireless Fidelity (Wireless-Fidelity, WiFi) manner, or infrared manner, or the like. The second UE may perform signaling-plane and/or user-plane data transmission with the associated first UE.

102. The second UE sends a network access request.

103. The first UE receives the network access request sent by the second UE.

104. The first UE sends a first message to a base station.

In the foregoing steps 103 and 104, the first message sent by the first UE to the base station is used to notify the base station that the first message is a message that the second UE associated with the first UE requests access to the network. To be specific, the first message includes a message that the second UE accesses the network by being associated with the first UE.

The first UE may send the first message to the base station in the following two manners:

Manner 1: The first UE sends the first message by using a network access preamble (preamble) sequence.

After the first UE needs to transmit data to a network side, a random access procedure (Random Access Procedure, RACH) needs to be performed. The random access manners may be classified into two types: contention-based random access and non-contention based random access. In the two manners, the UE sends a random access preamble to the base station (eNodeB), to notify the eNodeB that there is a random access request, so that the eNodeB can estimate a transmission delay between the eNodeB and the UE, and adjust uplink timing (uplink timing) based on the transmission delay. In the contention-based random access manner, a preamble index is randomly selected by the UE. In the non-contention based random access manner, a preamble index is specified by the eNodeB. In the non-contention based random access manner, the eNodeB allocates a dedicated preamble index to the UE to avoid a collision.

The preamble sequence is mainly used to notify the eNodeB that there is a random access request, and enable the eNodeB to estimate a transmission delay between the eNodeB and the UE, so that the eNodeB adjusts uplink timing, and notifies the UE of adjustment information by using a timing advance (timing advance). Each cell has 64 available preamble sequences, and the UE selects one (or specified by the eNodeB) of the preamble sequences for transmission on a PRACH. The preamble sequences may be divided into two parts: One part is used for the contention-based random access, and the other part is used for the non-contention based random access. Preamble sequences used for the contention-based random access may be further divided into two groups: a group A and a group B (the group B may not exist). The eNodeB sends these configurations by using RACH-ConfigCommon (a SIB2). A purpose for dividing the preamble sequences used for the contention-based random access into two groups, the group A and the group B, is to add specific prior information, so that the eNodeB allocates an appropriate uplink resource to an Msg3 in a RAR. There is no big difference between the preamble sequences in the group A and the preamble sequences in the group B.

Based on the foregoing description for random network access by the first UE, in Manner 1, the first UE sends the first message by using the network access preamble sequence. After specific implementation, there may be the following several manners:

(A) The first UE sends the first message by using some preamble sequences used to access the network.

Figure 2:
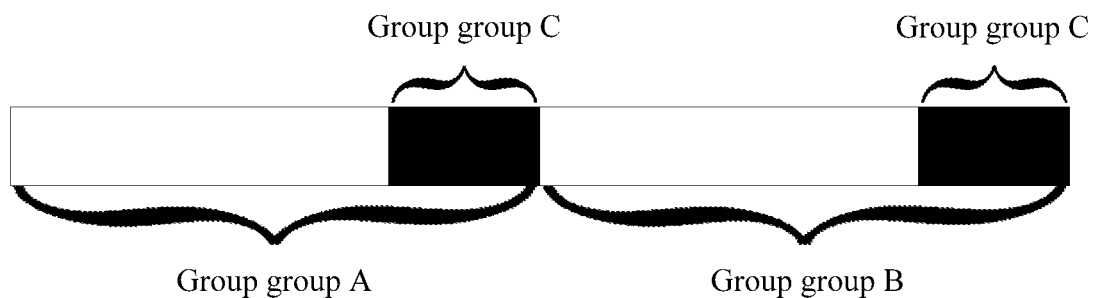
FIG. 2 is a schematic diagram of grouping preamble sequences according to Embodiment 1 of the present invention.

In Manner (A), as shown in FIG. 2, the first UE selects some preamble sequences as a group C from the some preamble sequences used to access the network, and sends the first message by using a preamble sequence in the group C.

For example, some preamble sequences are selected as the group C from the group A and/or the group B, and a preamble sequence in the group C is used to send the first message.

(B) The first UE sends the first message by using another preamble sequence other than the preamble sequence that is used to access the network.

Figure 3:
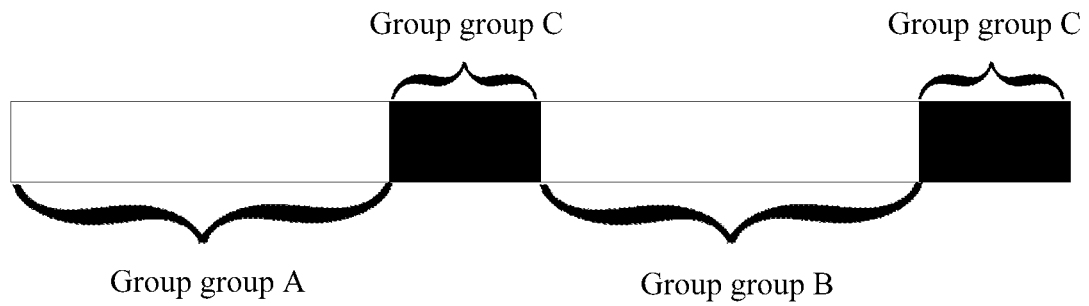
FIG. 3 is a schematic diagram of grouping preamble sequences according to Embodiment 1 of the present invention.

In Manner (B), as shown in FIG. 3, the first UE selects some preamble sequences as the group C from other preamble sequences than the preamble sequence that is used to access the network, or redetermines some preamble sequences as the group C, and sends the first message by using a preamble sequence in the group C.

Manner 2: The first UE sends the first message by using a preset bit of a Media Access Control (media access control, MAC) layer and/or a preset bit of a Packet Data Convergence Protocol (Packet Data Convergence Protocol, PDCP) layer.

In a random network access process of the first UE, a random network access message is sent. The message includes a MAC CE or a CCCH SDU. Therefore, in Manner 2, a specific implementation of sending the first message by the first UE by using the preset bit of the MAC layer or the preset bit of the PDCP layer may be further divided into the following several manners:

(A) The first UE sends the first message by using a reserved bit of the MAC layer.

Figure 4:
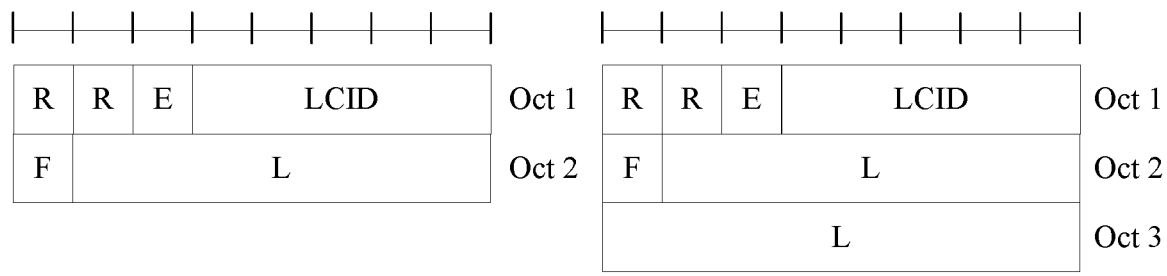
FIG. 4 is a schematic structural diagram of a MAC header according to Embodiment 1 of the present invention.

In an LTE communications system, there are two reserved bits in a MAC header. As shown in FIG. 4, the two reserved bits may be used to send the first message. For example, after randomly accessing the network, the first UE sends, by using the MAC CE, a network access message. The two reserved bits are 11, and are used to indicate the first message.

(B) The first UE sends the first message by using a reserved bit of the PDCP layer.

Figure 5:
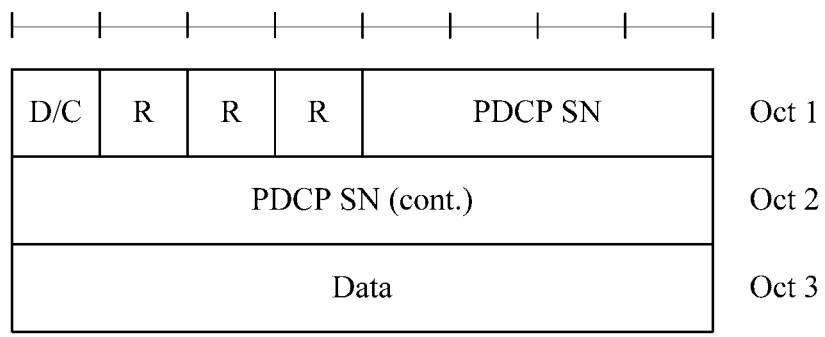
FIG. 5 is a schematic structural diagram of a PDCP PDU according to Embodiment 1 of the present invention.

In the LTE communications system, there are three reserved bits in the PDCP PDU. As shown in FIG. 5, the three reserved bits may be used to send the first message. For example, after randomly accessing the network, the first UE sends, by using the CCCH SDU, a network access message. The three bits are 110, and are used to indicate the first message.

(C) The first message is sent by using reserved bits of the MAC layer and the PDCP layer jointly.

The first message may be sent by using a combination of some reserved bits. For example, 110 is sent by using a reserved bit of the PDCP layer, and 11 is sent by using a reserved bit of the MAC layer.

In the first and second implementations of sending the first message, the first message includes the message that the second UE accesses the network by being associated with the first UE. To be specific, the first UE notifies the base station that the network access message sent by the first UE in this case is from the second UE. Further, the first message sent by the first UE further includes a message used to instruct the first UE to access the network. In this implementation, the first message sent by the first UE may be further used to notify the base station that the network access request sent by the first UE is that both the second UE and the first UE request access to the network. In specific implementation, the first manner or the second manner may be used.

105. The base station obtains the first message sent by the first UE.

The base station may obtain, in the following manners, the first message sent by the first UE:

Manner 1: The first message sent by the first UE is obtained from the network access preamble sequence sent by the first UE.

Manner 2: The first message sent by the first UE is obtained from the preset bit of the MAC layer and/or the preset bit of the PDCP layer.

For specific implementation of the two implementations in which the base station obtains the first message sent by the first UE, refer to the detailed description in the foregoing step 104. Details are not described again.

106. After receiving the first message, the base station sends an access response.

107. After the access response sent by a network device is received, the first UE and the second UE associated with the first UE access the network.

108. The base station allocates a network resource to the first UE based on the first message.

109. After the first UE receives the network resource allocated by the network device, the first UE and the second UE associated with the first UE send data by using the network resource.

In the foregoing steps 101 to 109, when the base station obtains the first message, and learns, based on the obtained first message, that the network access request is from the second UE but not the first UE, the eNB may perform special processing on the request, for example, giving different processing priorities or subsequently allocating different transmission resources.

In the foregoing steps 101 to 109, the first UE sends the first message to notify the base station that the second UE requests access to the network in this case, or both the second UE and the first UE request access to the network.

Figure 6:
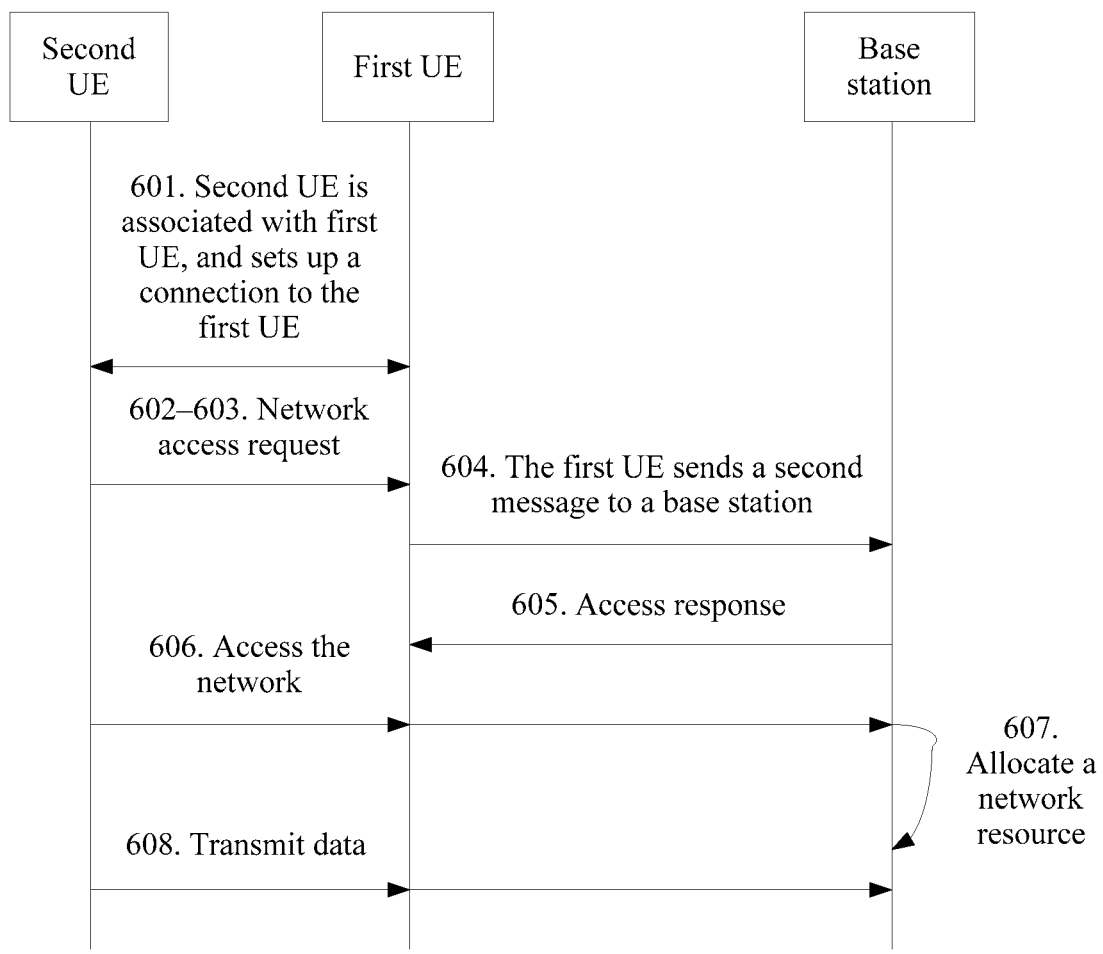
FIG. 6 is a schematic flowchart of separately sending a second message according to Embodiment 1 of the present invention.

Optionally, the first UE may further send a second message to the network side. The second message includes an identifier of the second UE that accesses the network by being associated with the first UE, and/or a quantity of second UEs that access the network by being associated with the first UE. The second message may be sent separately, or may be sent jointly with the first message. If the second message is sent separately, as shown in FIG. 6, a specific processing procedure is as follows:

If the first UE separately sends the second message to the network device, as shown in FIG. 6, a specific processing procedure is as follows:

601. The second UE is associated with the first UE, and sets up a connection to the first UE.

For a specific implementation of setting up the connection between the second UE and the first UE, refer to the detailed description in the foregoing step 101. Details are not described again.

602. The second UE sends a network access request.

603. The first UE receives the network access request sent by the second UE.

604. The first UE sends the second message to the base station.

605. After receiving the second message, the base station sends an access response to the first UE.

606. The first UE and the second UE access the network.

607. The base station allocates a network resource to the first UE based on the received second message.

608. The first UE and the second UE transmit data by using the allocated network resource.

Figure 7:
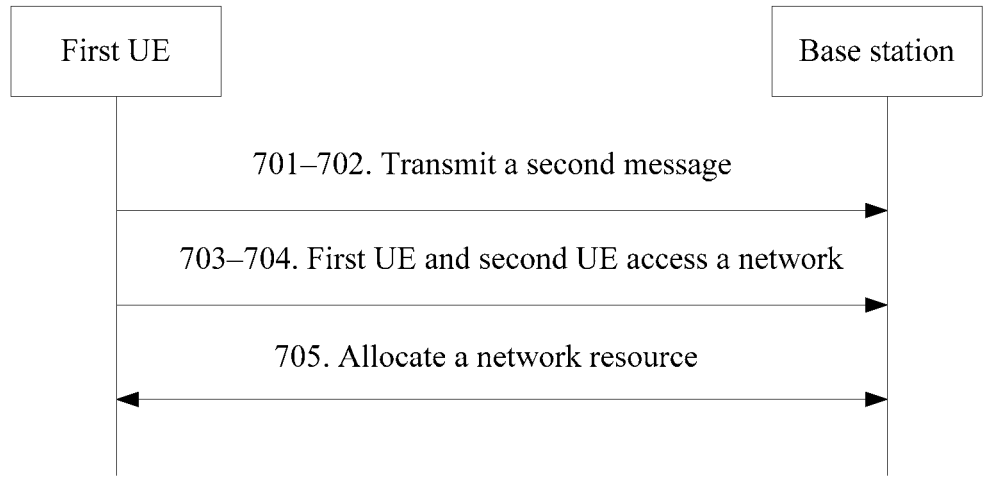
FIG. 7 is a schematic flowchart of jointly sending a second message and a first message according to Embodiment 1 of the present invention.

If the second message and the first message are sent jointly, an implementation of sending the second message and the first message is shown in FIG. 7. A specific processing procedure is as follows:

701. The first UE sends the second message.

702. The network device (the base station is used as an example for detailed description) receives the second message.

The second message includes identifiers of second UEs that request access to the network, and/or a quantity of second UEs that request access to the network.

If the second message includes the quantity of the second UEs that access the network by being associated with the first UE, the UE may send the second message in the following two manners. Correspondingly, the network device may also receive the second message in the following two manners.

Manner 1: The first UE sends the second message by using a preset uplink common control channel (Common Control Channel, CCCH) message (that is, the Msg3 sent by the first UE to the network device when the first UE randomly accesses the network).

In Manner 1, an uplink CCCH message is designed, and an indication field for indicating the quantity of second UEs that need to access the network is added to an RRC message of an RRC connection request. This may be specifically implemented in the following manner:

| RRCConnectionRequest-r8-IEs ::= | SEQUENCE { |
|---|---|
| ue-Identity | InitialUE-Identity, |
| wd-Identity | InitialWD-Identity, |
| establishmentCause | EstablishmentCause, |
| number of wds | number of wds |
| spare | BIT STRING (SIZE (1)) |
| } | |

In this implementation, the quantity of second UEs that access the network can be indicated by using a small quantity of bits. For example, for one first UE, a maximum quantity 16 of second UEs that access the network may be indicated by using 4 bits. Therefore, in the technical solutions provided in this embodiment of the present invention, compared with an original CCCH message, the CCCH message increases only a small amount of resource occupation space.

Manner 2: The first UE sends the second message by using a preset bit of a MAC layer and/or a preset bit of a PDCP layer.

In a manner in which the first UE sends the second message by using a reserved bit of the MAC layer, when the second message is sent by using the reserved bit (for example, two bits) of the MAC layer, network access messages corresponding to a maximum of four second UEs may be indicated.

In a manner in which the first UE sends the second message by using a reserved bit of the PDCP layer, when the reserved bit (for example, three bits) of the PDCP layer is used for indication, access requests of a maximum of eight second UEs may be indicated.

When reserved bits (five bits) of the MAC layer and the PDCP layer are used jointly for indication, access requests of a maximum of 32 second UEs may be indicated.

703. The network device sends an access response.

704. The first UE and the second UE associated with the first UE access the network.

705. The network device allocates a network resource based on the received first message and second message.

When the network device obtains the first message, and learns, based on the obtained first message, that the network access request is from the second UE but not the first UE, the network device may perform special processing on the request, for example, giving different processing priorities or subsequently allocating different transmission resources.

After the network device obtains the first message and the second message, in addition to performing corresponding processing based on the obtained first message, the network device allocates different network resources to the first UE and different second UEs based on the obtained second message.

Detailed description is provided based on an example in which the network device is the base station.

Figure 8:
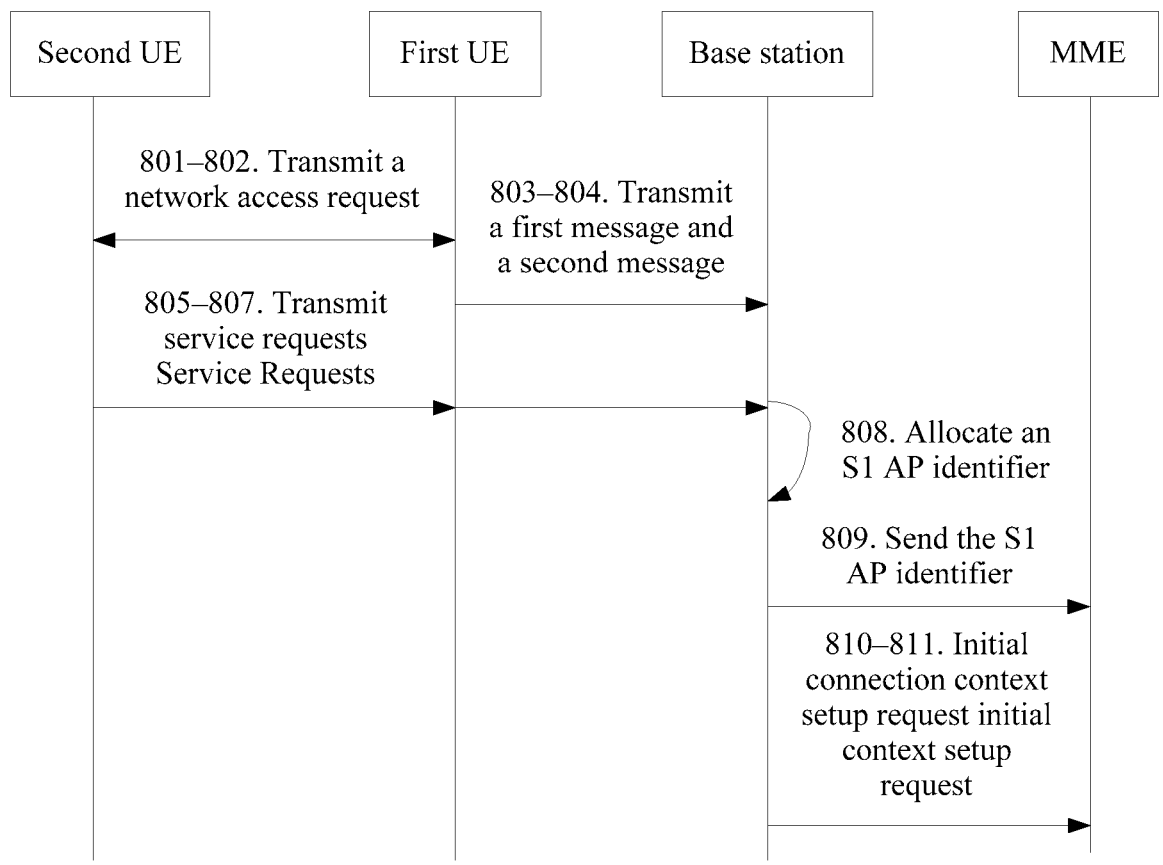
FIG. 8 is a schematic flowchart of allocating a network resource according to Embodiment 1 of the present invention.

The base station allocates the network resource based on the received first message and second message, and a specific processing procedure between the first UE and the network device may include the following two implementations, (A) and (B), which are specifically as follows:

Manner (A) is as follows:

The base station learns, based on the received first message and second message, that the second UE requests access to the network and there are K second UEs associated with the first UE, and the eNB may schedule uplink resources for subsequent K service requests (Service Requests) of the second UEs. In Manner (A), the eNB first receives service requests sent by the first UE, then receives K service requests sent by the second UEs, and sends the K service requests to the MME one by one by using the S1-AP protocol. As shown in FIG. 8, a specific processing procedure of the manner is as follows:

801. The second UEs send network access requests to the first UE.

802. The first UE receives the network access requests sent by the second UEs.

803. The first UE sends the first message and the second message to the eNB.

For a specific implementation of sending the first message and the second message by the first UE, refer to the detailed description in the foregoing steps 104 and 201. Details are not described again.

804. The eNB learns, based on the received first message, that the second UEs request access to the network, and a quantity of the second UEs that request access to the network.

805. The second UEs send service requests by using the associated first UE.

806. The first UE sends the service requests.

807. The eNB receives the service requests.

808. The eNB separately allocates S1 AP identifiers to the first UE and the second UEs.

For example, the eNB allocates a unique eNB UE1 S1AP ID to the first UE, and the eNB allocates a unique eNB UE2 S1AP ID to the second UE.

809. The eNB separately adds the S1 AP identifiers allocated to the first UE and the second UEs to initial UE messages of the S1-AP protocol, and sends the initial UE messages to the MME.

810. The MME separately receives the initial UE messages to which the S1 AP identifiers of the first UE and the second UEs are added.

811. The MME separately sends initial context setup requests initial context setup request including the S1 AP identifiers of the first UE and the second UEs to the eNB.

The initial context setup request that includes the S1 AP identifier of the second UE is used to set up a context for the second UE.

In implementation (A), if a plurality of second UEs need to access the network at the same time, the MME needs to set up contexts for the second UEs one by one based on a plurality of eNB UE2 S1AP IDs.

The base station learns, based on the received first message and second message, that the second UEs request access to the network and there are the K second UEs associated with the first UE, and then a specific processing procedure between the first UE, the second UE, and the network device is the following (B).

In Manner (B), the second message includes the quantity of second UEs.

Figure 9:
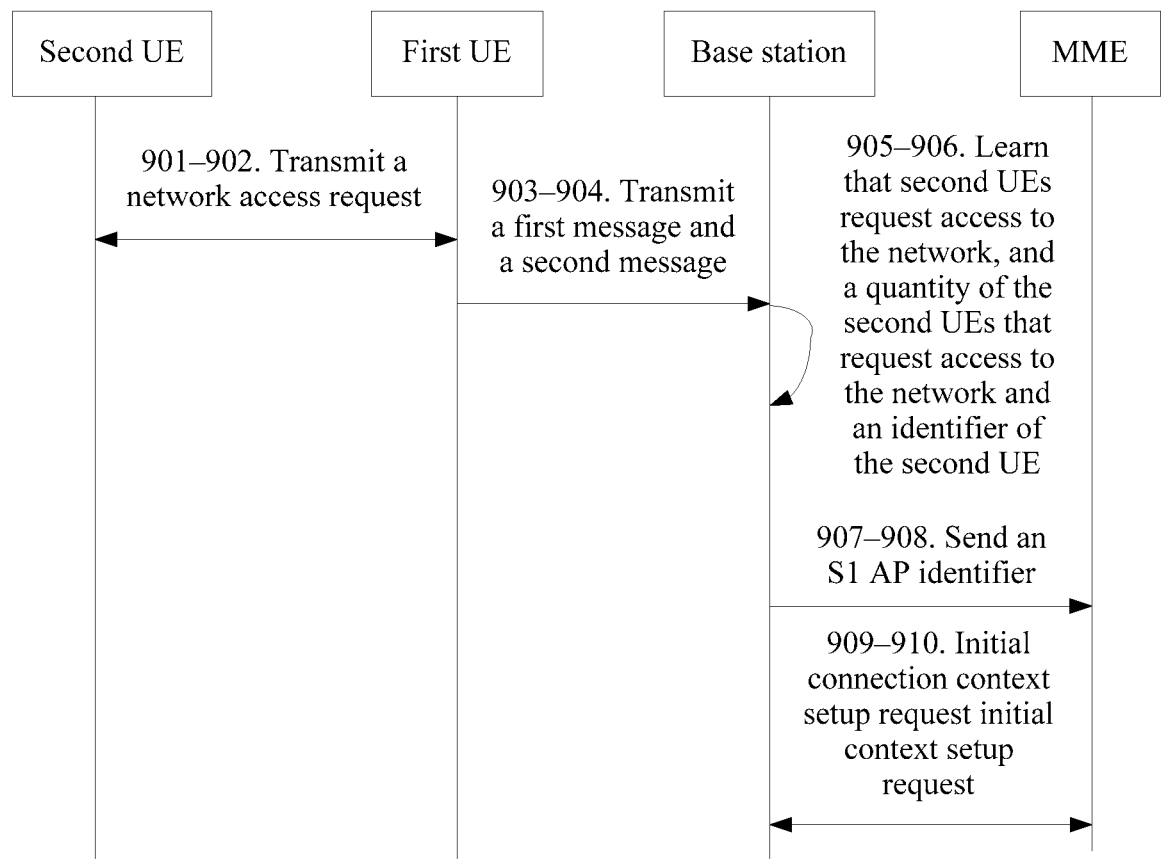
FIG. 9 is a flowchart of interaction processing between first UE, second UE, and a network device according to Embodiment 1 of the present invention.

In Manner (B), a relatively large quantity of transmission resources need to be allocated to RRC connection setup complete, and are used to send, in a NAS message, an identifier ID of the first UE and identifiers IDs of all the second UEs that need to access the network by using the first UE. After the second message includes the quantity of second UEs, an interaction processing procedure between the first UE, the second UE, and the network device is shown in FIG. 9, which is specifically as follows:

901. The second UEs send network access requests to the first UE.

902. The first UE receives the network access requests sent by the second UEs.

903. The first UE sends the first message and the second message to the eNB.

For a specific implementation of sending the first message by the first UE, refer to the detailed description in the foregoing step 104. Details are not described again.

904. The first UE sends, in a NAS message, an identifier ID of the first UE and identifiers IDs of all the second UEs that need to access the network by using the first UE.

905. The eNB learns, based on the received first message and second message, that the second UEs request access to the network, and the quantity of second UEs that request access to the network.

906. The eNB further learns, based on the NAS message (service requests message) sent by the first UE, the ID of the first UE and the identifiers IDs of the second UEs that need to access the network.

907. The eNB separately allocates S1 AP identifiers to the first UE and the second UEs based on the obtained identifiers IDs of the first UE and the second UEs.

For example, the eNB allocates a unique eNB UE1 S1AP ID to the first UE, and the eNB allocates a unique eNB UE2 S1AP ID to the second UE.

908. The eNB separately adds the S1 AP identifiers allocated to the first UE and the second UEs to initial UE messages of the S1-AP protocol, and sends the initial UE messages to the MME.

909. The MME separately receives the initial UE messages to which the S1 AP identifiers of the first UE and the second UEs are added.

910. The MME separately sends initial context setup requests that include the S1 AP identifiers of the first UE and the second UEs to the eNB.

The initial context setup request that includes the S1 AP identifier of the second UE is used to set up a context for the second UE.

Further, if the second message includes the identifiers of the second UEs that access the network by being associated with the first UE, the first UE may send the second message in the following two manners. Correspondingly, the network device may also receive the second message in the following two manners.

Manner 1: The first UE sends the second message by using a preset uplink common control channel (Common Control Channel, CCCH) message (the Msg3), and the CCCH message includes a list of the identifiers of the second UEs, which is specifically as follows:

```
RRCConnectionRequest-r6-IEs ::=    SEQUENCE {
    wd-Identity list               InitialWD-Identity list,
    ue-Identity                    InitialUE-Identity, OPTIONAL
    establishmentCause             EstablishmentCause,
    spare                          BIT STRING (SIZE (1))
}
```

To be specific, an ID list field of the second UEs that need to access the network side is added to an RRC message of the RRC connection request. The CCCH message needs more resource occupation space than the original CCCH message, to accommodate more ID fields.

Manner 2: The first UE sends the second message by using a preset bit of a MAC layer and/or a preset bit of a PDCP layer, and the preset bit is used to indicate an identifier of a second UE.

In a manner in which the first UE sends the second message by using a reserved bit of the MAC layer, the second message is sent by using the reserved bit (for example, two bits) of the MAC layer; or in a manner in which the first UE sends the second message by using a reserved bit of the PDCP layer, the second message is sent by using the reserved bit (for example, three bits) of the PDCP layer; or the first UE sends the second message by using reserved bits (five bits) of the MAC layer and the PDCP layer jointly. Then, the first UE uses the reserved bit of the MAC layer or the reserved bit of the PDCP layer, or uses the reserved bits of the MAC layer and the PDCP layer jointly to indicate the identifiers IDs of the second UEs.

First, the identifier of the second UE may be a C-RNTI (16 bits) or an S-TMSI (40 bits), or a relative ID (an ID relative to UE, such as 1, 2, or 3). The identifier of the second UE is not limited herein, provided that the identifier can be used to identify the second UE.

If the identifier of the second UE is the C-RNTI (16 bits) or the S-TMSI (40 bits), the identifier of the first UE that is in the RRC message of the RRC connection request may be omitted. In this case, when the first UE and the second UE are associated, the network devices (the eNB and the MME) need to record an association relationship between the first UE and the second UE. After the first UE and the second UE terminate the association relationship, the network devices need to record that the first UE and the second UE terminate the association relationship. Therefore, the first UE sends only the ID of the second UE, and all the network devices (the eNB and the MME) know whether the second UE is associated with the first UE. If the second UE is associated with the first UE, the network devices may learn, based on the stored association relationship, the ID of the associated UE. If the identifier of the second UE is the relative ID, the RRC message of the RRC connection request needs to include the identifier of the first UE, so that the network device obtains the identifier of the second UE based on the identifier of the first UE through calculation. In this case, after the first UE and the second UE are associated, the network devices (the eNB and the MME) also need to record an association relationship between the first UE and the second UE, and records the relative ID of the second UE. After the second UE and the first UE terminate the association relationship, the network devices record that the second UE and the first UE terminate the association relationship.

After the eNB receives, from the second message, the ID of the first UE and the identifier of the second UE that needs to access the network, and receives the service request sent by the first UE, the eNB separately allocates unique S1AP IDs to the first UE and the second UE based on a NAS PDU and the identifiers of the first UE and the second UE, then adds the S1AP IDs to initial UE messages of the S1-AP protocol, and sends the initial UE messages one by one to the MME. If a plurality of second UEs need to access the network at the same time, the MME needs to set up contexts for the second UEs one by one based on a plurality of S1AP IDs. Details are as follows.

Step 1: The second UEs send network access requests to the first UE.

Step 2: The first UE receives the network access requests sent by the second UEs.

Step 3: The first UE sends the first message and the second message to the eNB.

For a specific implementation of sending the first message and the second message by the first UE, refer to the detailed description in the foregoing steps 104 and 201. Details are not described again.

Step 4: The eNB learns, based on the received first message and second message, that the second UEs request access to the network, and the identifiers of the second UEs that request access to the network.

Step 5: The eNB stores the identifiers of the second UE.

In the foregoing step, in specific implementation, the first UE needs to send only one service request. The service request may carry only the identifier of the first UE, or the service request includes an indication for indicating an access status of the second UEs.

Step 6: The eNB sends, for the first UE and the second UEs, the initial UE messages to the MME by using the S1-AP protocol.

In specific implementation, an implementation is that the eNB may first send an initial UE message of the first UE, and then separately send initial UE messages of the second UEs. The MME sets up contexts for the first UE and the second UEs one by one. Another implementation is as follows: An initial UE message may be modified, so that the initial UE message may carry more NAS PDUs. The eNB may send all NAS PDUs (including the identifier of the first UE and the identifiers of the second UEs) to the MME at a time, and the MME sets up contexts for the first UE and the second UEs one by one.

In the foregoing manner, the second message includes the identifiers of the second UEs, the first UE sends only the service request of the first UE, and does not send the service requests of the second UEs. Therefore, the eNB needs to set up an initialization context process for the second UEs (to enable sending of the initial UE message for the second UEs).

The initial UE message sent by the eNB for the second UEs is a new initial UE message in which the NAS PDU is not included and only the identifiers of the second UEs are included. The eNB sends all the identifiers of the second UEs to the MME at a time or one by one (for example, the identifier of the second UE may be an eNB UE2 S1AP ID) by using the new initial UE message.

The MME receives the identifiers of the second UEs based on the new initial UE message, and the MME learns the second UEs that need to access the network, and then sends the initial context setup request that includes the identifiers of the second UEs, so as to sequentially set up contexts for WDs.

Embodiment 2

Figure 10:
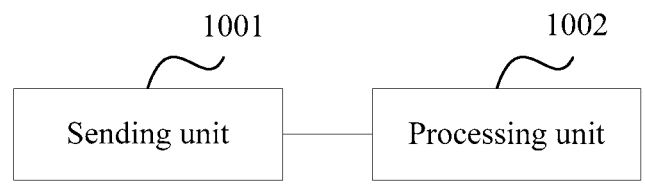
FIG. 10 and FIG. 11 are schematic diagrams of structural composition of first UE according to Embodiment 2 of the present invention.

Embodiment 2 of the present invention provides first UE. As shown in FIG. 10, the first UE includes:

a sending unit 1001, configured to send a first message, where the first message includes a message that second UE accesses a network by being associated with the first UE; and a processing unit 1002, configured to: after an access response sent by a network device is received, enable the first UE to access the network with the second UE associated with the first UE, where after receiving the first message, the network device sends the access response to the first UE.

Specifically, the sending unit 1001 is further configured to send a second message, so that the network device allocates a network resource to the first UE based on the first message and the second message, or the network device allocates a network resource to the first UE and the second UE based on the first message and the second message, where the second message includes an identifier of the second UE that accesses the network by being associated with the first UE, and/or a quantity of second UEs that access the network by being associated with the first UE.

Specifically, the sending unit 1001 is specifically configured to: send the first message by using a network access preamble preamble sequence, or send the first message by using a preset bit of a Media Access Control MAC layer and/or a preset bit of a Packet Data Convergence Protocol PDCP layer.

Specifically, the sending unit 1001 is specifically configured to: send the first message by using some preamble sequences used to access the network, or send the first message by using another preamble sequence other than the preamble sequence that is used to access the network.

Specifically, the first message sent by the sending unit 1001 further includes a message that the first UE accesses the network.

Specifically, the sending unit 1001 is specifically configured to: send the second message by using a preset uplink common control channel CCCH message message; or send the second message by using the preset bit of the MAC layer and/or the preset bit of the PDCP layer.

Specifically, the sending unit 1001 is specifically configured to send the second message by using a radio control connection request RRC connection request, where an RRC message in the RRC connection request includes the identifier of the second UE that accesses the network by being associated with the first UE, and/or the quantity of second UEs that access the network by being associated with the first UE.

Specifically, the identifier of the second UE that is sent by the sending unit 1001 includes at least one of the following identifiers: a cell radio network temporary identifier C-RNTI; a short format temporary mobile subscriber identity S-TMSI; and an identifier corresponding to an identifier of the first UE.

Figure 11:
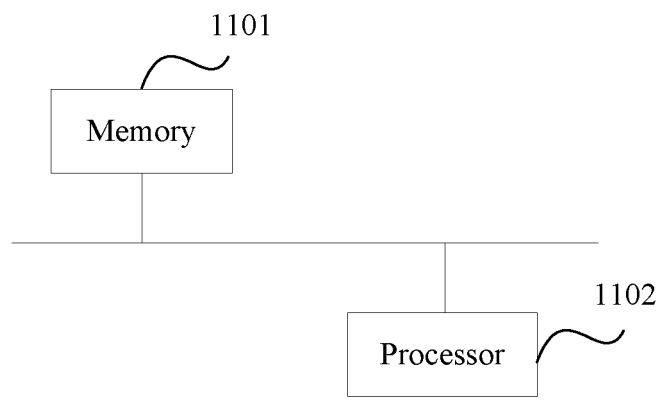

An embodiment of the present invention further provides first UE. As shown in FIG. 11, the first UE includes a memory 1101 and a processor 1102. The memory 1101 is configured to store a set of programs, and the processor 1102 is configured to perform, based on the programs stored in the memory 1101, specific functions of the sending unit and the processing unit of the first UE shown in FIG. 10.

The memory may be a volatile memory (volatile memory) such as a random-access memory (random-access memory, RAM); or a non-volatile memory (non-volatile memory) such as a flash memory (flash memory), a hard disk drive (hard disk drive, HDD), or a solid-state drive (solid-state drive, SSD); or a combination of the foregoing types of memories.

The processor may be a central processing unit (central processing unit, CPU), or a combination of a CPU and a hardware chip. Alternatively, the processor may be a network processor (network processor, NP), a combination of a CPU and an NP, or a combination of an NP and a hardware chip.

The hardware chip may be one or a combination of a plurality of the following: an application-specific integrated circuit (application-specific integrated circuit, ASIC), a field-programmable gate array (field-programmable gate array, FPGA), and a complex programmable logical device (complex programmable logic device, CPLD).

Embodiment 3

Figure 12:
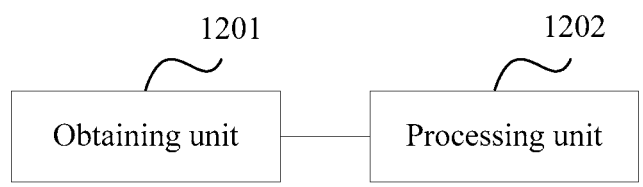
FIG. 12 and FIG. 13 are schematic diagrams of structural composition of a network device according to Embodiment 3 of the present invention.

Embodiment 3 of the present invention provides a network device. As shown in FIG. 12, the network device includes:

an obtaining unit 1201, configured to receive a first message sent by first UE, where the first message includes a message that second UE accesses a network by being associated with the first UE; and a processing unit 1202, configured to: after the first message is received, send an access response to the first UE, so that the first UE and the second UE access the network.

Optionally, the processing unit 1202 is further configured to allocate a network resource to the first UE and the second UE based on the first message, so that after the first UE receives the network resource allocated by the network device, the first UE and the second UE associated with the first UE send data by using the network resource.

The obtaining unit 1201 is further configured to obtain a second message sent by the first UE, where the second message includes an identifier of the second UE that accesses the network by being associated with the first UE, and/or a quantity of second UEs that access the network by being associated with the first UE. The processing unit 1202 is specifically configured to allocate the network resource to the first UE and the second UE based on the first message and the second message.

The obtaining unit 1201 is specifically configured to: obtain, from a network access preamble preamble sequence sent by the first UE, the first message sent by the first UE; or obtain, from a preset bit of a Media Access Control address MAC layer and/or a preset bit of a Packet Data Convergence Protocol PDCP layer, the first message sent by the first UE.

The first message obtained by the obtaining unit 1201 further includes a message that the first UE accesses the network.

The obtaining unit 1201 is specifically configured to: obtain the second message from a preset uplink common control channel CCCH message message sent by the first UE, or obtain the second message from a specified bit of a MAC layer and/or a specified bit of a PDCP layer of the first UE.

The obtaining unit 1201 is specifically configured to: receive a radio control connection request RRC connection request sent by the first UE, and obtain the second message from the RRC connection request, where an RRC message in the RRC connection request includes the identifier of the second UE that accesses the network by being associated with the first UE, and/or the quantity of second UEs that access the network by being associated with the first UE.

The identifier of the second UE that is obtained by the obtaining unit 1201 includes one of the following identifiers: a cell radio network temporary identifier C-RNTI; a short format temporary mobile subscriber identity S-TMSI; and an identifier corresponding to an identifier of the first UE.

The obtaining unit 1201 is further configured to obtain the identifier of the second UE from the second message; and the processing unit 1202 is specifically configured to: determine, based on a stored correspondence between an identifier of the second UE and an identifier of the first UE, the identifier of the first UE corresponding to the obtained identifier of the second UE; and determine, based on the identifier of the first UE corresponding to the obtained identifier of the second UE, the first UE associated with the second user equipment.

The obtaining unit 1201 is further configured to: obtain the identifier of the first UE and the identifier of the second UE from the second message; and determine, based on the obtained identifier of the first UE, the obtained identifier of the second UE, and a stored correspondence between an identifier of the second UE and an identifier of the first UE, the first UE associated with the second UE.

The processing unit 1202 is specifically configured to: after receiving a network access message that is sent by at least one second UE by using the associated first UE, generate a corresponding S1AP identifier for the second user equipment; and send the S1AP identifier.

Figure 13:
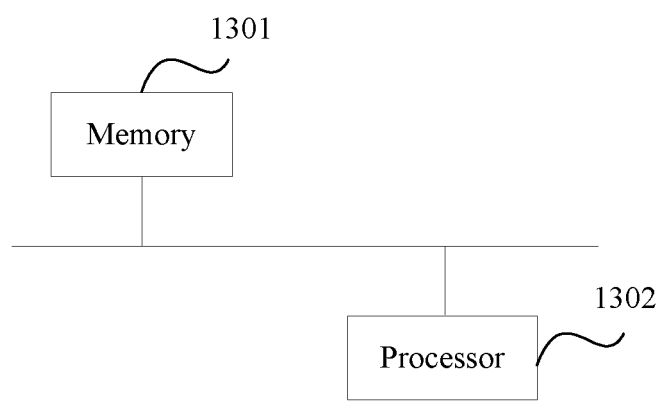

Embodiment 3 of the present invention further provides a network device. As shown in FIG. 13, the network device includes a memory 1301 and a processor 1302. The memory 1301 is configured to store a set of programs, and the processor 1302 is configured to perform, based on the programs stored in the memory 1301, specific functions of the obtaining unit and the processing unit of the first UE shown in FIG. 12.

The memory may be a volatile memory (volatile memory) such as a random-access memory (random-access memory, RAM); or a non-volatile memory (non-volatile memory) such as a flash memory (flash memory), a hard disk drive (hard disk drive, HDD), or a solid-state drive (solid-state drive, SSD); or a combination of the foregoing types of memories.

The processor may be a central processing unit (central processing unit, CPU), or a combination of a CPU and a hardware chip. Alternatively, the processor may be a network processor (network processor, NP), a combination of a CPU and an NP, or a combination of an NP and a hardware chip.

The hardware chip may be one or a combination of a plurality of the following: an application-specific integrated circuit (application-specific integrated circuit, ASIC), a field-programmable gate array (field-programmable gate array, FPGA), and a complex programmable logical device (complex programmable logic device, CPLD).

Optionally, the network device provided in Embodiment 3 of the present invention may further include an interface.

The interface may be one or more of the following: a network interface controller (network interface controller, NIC) that provides a wired interface, for example, an Ethernet NIC that can provide a copper interface and/or a fiber interface; and an NIC that provides a wireless interface, for example, a wireless local area network (wireless local area network, WLAN) NIC.

Embodiment 4

Figure 14:
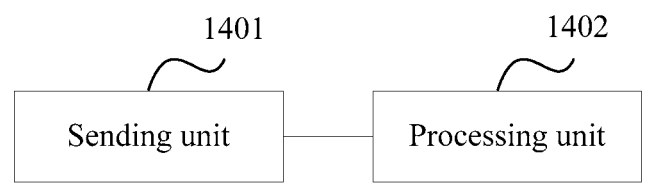
FIG. 14 is a schematic diagram of structural composition of first UE according to Embodiment 4 of the present invention.

Embodiment 4 of the present invention provides first UE. Referring to FIG. 14, structural composition of the first UE includes:

a sending unit 1401, configured to send a second message, where the second message includes an identifier of second UE that accesses a network by being associated with the first UE, and/or a quantity of second UEs that access the network by being associated with the first UE; and a processing unit 1402, configured to: after an access response sent by a network device is received, enable the first UE to access the network with the second UE associated with the first UE.

Specifically, the sending unit 1401 is specifically configured to: send the second message by using a preset uplink common control channel CCCH message message; or send the second message by using a preset bit of a MAC layer and/or a preset bit of a PDCP layer.

Specifically, the sending unit 1401 is specifically configured to send the second message by using a radio control connection request RRC connection request, where an RRC message in the RRC connection request includes the identifier of the second UE that accesses the network by being associated with the first UE, and/or the quantity of second UEs that access the network by being associated with the first UE.

Specifically, the identifier of the second UE that is sent by the sending unit 1401 includes at least one of the following identifiers: a cell radio network temporary identifier C-RNTI; a short format temporary mobile subscriber identity S-TMSI; and an identifier corresponding to an identifier of the first UE.

An embodiment of the present invention further provides first UE. The first UE includes a memory and a processor. The memory is configured to store a set of programs, and the processor is configured to perform, based on the programs stored in the memory, specific functions of the sending unit and the processing unit of the first UE shown in FIG. 14.

The memory may be a volatile memory (volatile memory) such as a random-access memory (random-access memory, RAM); or a non-volatile memory (non-volatile memory) such as a flash memory (flash memory), a hard disk drive (hard disk drive, HDD), or a solid-state drive (solid-state drive, SSD); or a combination of the foregoing types of memories.

The processor may be a central processing unit (central processing unit, CPU), or a combination of a CPU and a hardware chip. Alternatively, the processor may be a network processor (network processor, NP), a combination of a CPU and an NP, or a combination of an NP and a hardware chip.

The hardware chip may be one or a combination of a plurality of the following: an application-specific integrated circuit (application-specific integrated circuit, ASIC), a field-programmable gate array (field-programmable gate array, FPGA), and a complex programmable logical device (complex programmable logic device, CPLD).

Embodiment 5

Figure 15:
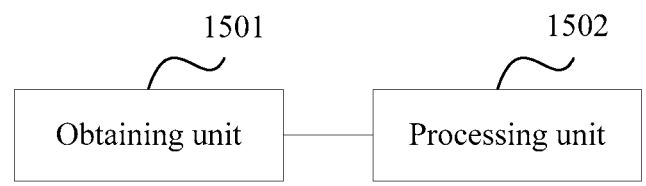
FIG. 15 is a schematic diagram of structural composition of a network device according to Embodiment 5 of the present invention.

Embodiment 5 of the present invention provides a network device. As shown in FIG. 15, the network device includes:

an obtaining unit 1501, configured to obtain a second message sent by first user equipment UE, where the second message includes an identifier of second UE that accesses a network by being associated with the first UE, and/or a quantity of second UEs that access the network by being associated with the first UE; and a processing unit 1502, configured to: after the second message is received, send an access response to the first UE, so that the first UE and the second UE access the network.

Optionally, the processing unit 1502 is further configured to allocate a network resource to the first UE and the second UE based on the second message, so that after the first UE receives the network resource allocated by the network device, the first UE and the second UE associated with the first UE send data by using the network resource.

Specifically, the obtaining unit 1501 is specifically configured to: obtain the second message from a preset uplink common control channel CCCH message message sent by the first UE, or obtain the second message from a specified bit of a MAC layer and/or a specified bit of a PDCP layer of the first UE.

Specifically, the obtaining unit 1501 is specifically configured to: receive a radio control connection request RRC connection request sent by the first UE, and obtain the second message from the RRC connection request, where an RRC message in the RRC connection request includes the identifier of the second UE that accesses the network by being associated with the first UE, and/or the quantity of second UEs that access the network by being associated with the first UE.

Specifically, the identifier of the second UE that is obtained by the obtaining unit 1501 includes one of the following identifiers: a cell radio network temporary identifier C-RNTI; a short format temporary mobile subscriber identity S-TMSI; and an identifier corresponding to an identifier of the first UE.

Embodiment 5 of the present invention further provides a network device. The network device includes a memory and a processor. The memory is configured to store a set of programs, and the processor is configured to perform, based on the programs stored in the memory, specific functions of the obtaining unit and the processing unit of the first UE shown in FIG. 14.

The memory may be a volatile memory (volatile memory) such as a random-access memory (random-access memory, RAM); or a non-volatile memory (non-volatile memory) such as a flash memory (flash memory), a hard disk drive (hard disk drive, HDD), or a solid-state drive (solid-state drive, SSD); or a combination of the foregoing types of memories.

The processor may be a central processing unit (central processing unit, CPU), or a combination of a CPU and a hardware chip. Alternatively, the processor may be a network processor (network processor, NP), a combination of a CPU and an NP, or a combination of an NP and a hardware chip.

The hardware chip may be one or a combination of a plurality of the following: an application-specific integrated circuit (application-specific integrated circuit, ASIC), a field-programmable gate array (field-programmable gate array, FPGA), and a complex programmable logical device (complex programmable logic device, CPLD).

Optionally, the network device provided in Embodiment 5 of the present invention may further include an interface.

The interface may be one or more of the following: a network interface controller (network interface controller, NIC) that provides a wired interface, for example, an Ethernet NIC that can provide a copper interface and/or a fiber interface; and an NIC that provides a wireless interface, for example, a wireless local area network (wireless local area network, WLAN) NIC.

Persons skilled in the art should understand that the embodiments of the present invention may be provided as a method, an apparatus (device), or a computer program product. Therefore, the present invention may use a form of hardware only embodiments, software only embodiments, or embodiments with a combination of software and hardware. In addition, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A method for accessing a network by user equipment (UE), comprising:
sending, by first UE, a first message, wherein the first message comprises a message indicating that a second UE is to accesses a network, the second UE being associated with the first UE; and
after an access response sent by a network device is received, accessing, by the first UE and the second UE associated with the first UE, the network, wherein the access response is sent to the first UE by the network device after the first message is received by the network device
wherein the UE has the ability to send the first message in both of the following ways:
sending, by the first UE, the first message by using a network access preamble sequence; and
sending, by the first UE, the first message by using a preset bit of a Media Access Control (MAC) layer and/or a preset bit of a Packet Data Convergence Protocol PDCP layer.

2. The method according to claim 1, further comprising:
sending, by the first UE, a second message, wherein the network device allocates a network resource to at least one of the first UE or the second UE based on the first message and the second message, and wherein
the second message comprises an identifier of the second UE that accesses the network by being associated with the first UE, and/or a quantity of second UEs that access the network by being associated with the first UE.

3. The method according to claim 1, wherein sending, by the first UE, the first message by using the network access preamble sequence comprises:
sending, by the first UE, the first message by using a portion of preamble sequences used to access the network; or
sending, by the first UE, the first message by using another preamble sequence other than the preamble sequence that is used to access the network.

4. The method according to claim 1, wherein the first message further comprises a message indicating that the first UE accesses the network.

5. The method according to claim 1, wherein the sending, by the first UE, a second message comprises:
sending, by the first UE, the second message by using a preset uplink common control channel CCCH message; or
sending, by the first UE, the second message by using the preset bit of the MAC layer and/or the preset bit of the PDCP layer.

6. The method according to claim 5, wherein sending, by the first UE, the second message by using the preset uplink CCCH message comprises:
sending, by the first UE, the second message by using a radio resource connection request (RRC) connection request, wherein an RRC message in the RRC connection request comprises the identifier of the second UE that accesses the network by being associated with the first UE, and/or a quantity of second UEs accessing the network by being associated with the first UE.

7. The method according to claim 5, wherein the identifier of the second UE comprises at least one of the following identifiers:
a cell radio network temporary identifier C-RNTI;
a short format temporary mobile subscriber identity S-TMSI; or
an identifier corresponding to an identifier of the first UE.

8. A method for accessing a network by user equipment (UE), comprising:
receiving, by a network device, a first message sent by first UE, wherein the first message comprises a message indicating that a second UE is to access a network, the second UE being associated with the first UE; and
after receiving the first message, sending, by the network device, an access response to the first UE to facilitate the first UE and the second UE to access the network;
Wherein the network device has the ability to receive the first message sent by the UE in both of the following ways:
receiving, by the network device from a network access preamble sequence sent by the first UE, the first message sent by the first UE; and
receiving, by the network device from a preset bit of a Media Access Control (MAC) layer and/or a preset bit of a Packet Data Convergence Protocol (PDCP) layer, the first message sent by the first UE.

9. The method according to claim 8, further comprising:
allocating, by the network device, a network resource to at least one of the first UE or the second UE based on the first message and a second message, wherein the network resource is used by first and the second UE to access the network
after the first UE receives the network resource allocated by the network device, the first UE and the second UE associated with the first UE send data by using the network resource.

10. The method according to claim 8, wherein the first message further comprises a message that the first UE accesses the network.

11. The method according to claim 9, further comprising:
obtaining, by the network device, a second message sent by the first UE, wherein the second message comprises an identifier of the second UE and/or a quantity of second UEs that access the network, and wherein
allocating, by the network device, a network resource to the first UE and the second UE based on the first message comprises:
allocating, by the network device, the network resource to at least one of the first UE and the second UE based on the first message and the second message.

12. The method according to claim 11, wherein obtaining, by the network device, the second message sent by the first UE comprises:
obtaining, by the network device, the second message from a preset uplink common control channel (CCCH) message sent by the first UE; or
obtaining, by the network device, the second message from a specified bit of a MAC layer and/or a specified bit of a Packet Data Convergence Protocol (PDCP) layer of the first UE.

13. The method according to claim 11, wherein allocating, by the network device, the network resource to at least one of the first UE or the second UE based on the first message and the second message comprises:

after receiving a network access message that is sent by at least one second UE by using the associated first UE, generating, by the network device, a corresponding S1 Application Protocol (S1-AP) identifier for the second UE; and sending, by the network device, the S1-AP identifier.

14. The method according to claim 12, wherein obtaining, by the network device, the second message from the preset uplink CCCH message sent by the first user equipment comprises:

receiving, by the network device, a radio resource connection request (RRC) connection request sent by the first UE; and obtaining, by the network device, the second message from the RRC connection request, wherein an RRC message in the RRC connection request comprises the identifier of the second UE that accesses the network, and/or the quantity of second UEs that access the network.

15. The method according to claim 12, wherein after obtaining, by the network device, the second message from the RRC connection request, the method further comprises:

obtaining, by the network device, the identifier of the second UE from the second message;

determining, based on a stored correspondence between an identifier of the second UE and an identifier of the first UE, the identifier of the first UE corresponding to the obtained identifier of the second UE; and determining, based on the identifier of the first UE corresponding to the obtained identifier of the second UE, the first UE associated with the second user equipment.

16. The method according to claim 12, wherein after obtaining, by the network device, the second message from the RRC connection request, the method further comprises:

obtaining, by the network device, the identifier of the first UE and the identifier of the second UE from the second message; and determining, based on the obtained identifier of the first UE, the obtained identifier of the second UE, and a stored correspondence between an identifier of the second UE and an identifier of the first UE, the first UE associated with the second UE.

17. The method according to claim 14, wherein the identifier of the second UE comprises at least one of the following identifiers:

a cell radio network temporary identifier C-RNTI;

a short format temporary mobile subscriber identity S-TMSI; or an identifier corresponding to an identifier of the first UE.

* * * * *